US012590612B2

(12) United States Patent (10) Patent No.: US 12,590,612 B2
Ortmann (45) Date of Patent: Mar. 31, 2026

(54) MULTI-PISTON DISENGAGEMENT SYSTEM FOR A BRAKE DEVICE OF A VEHICLE, BRAKE DEVICE FOR A VEHICLE HAVING A MULTI-PISTON DISENGAGEMENT SYSTEM, AND TRANSMISSION ARRANGEMENT FOR A VEHICLE HAVING THE BRAKE DEVICE

(71) Applicant: Schaeffler Technologies AG & Co. KG, Herzogenaurach (DE)

(72) Inventor: Simon Ortmann, Pulheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/838,252

(22) PCT Filed: Feb. 16, 2023

(86) PCT No.: PCT/DE2023/100126
§ 371 (c)(1),
(2) Date: Aug. 14, 2024

(87) PCT Pub. No.: WO2023/160752
PCT Pub. Date: Aug. 31, 2023

(65) Prior Publication Data
US 2025/0154992 A1    May 15, 2025

(30) Foreign Application Priority Data
Feb. 22, 2022    (DE) ..................... 10 2022 104 136.0

(51) Int. Cl.
*F16D 65/18*        (2006.01)
*F16D 55/40*        (2006.01)
(Continued)

(52) U.S. Cl.
CPC ........... *F16D 55/40* (2013.01); *F16D 65/186* (2013.01); *F16D 2055/0091* (2013.01); *F16D 2121/04* (2013.01); *F16D 2125/06* (2013.01)

(58) Field of Classification Search
CPC .............................. F16D 65/186; F16D 55/24
See application file for complete search history.

(56) References Cited

U.S. PATENT DOCUMENTS 3,970,174 A        7/1976  Kirkhart
5,009,293 A  *    4/1991  Takahashi ............... F16D 55/36
                                                        188/264 G
(Continued)

FOREIGN PATENT DOCUMENTS

CN            107289118  B  *  8/2021  ............. F16D 55/32
DE        102018131876  A1    6/2020
(Continued)

OTHER PUBLICATIONS

International Search Report and Written Opinion for PCT/DE2023/100126, dated May 26, 2023, 15 Pages.
(Continued)

*Primary Examiner* — Stacey A Fluhart

(57)        ABSTRACT

A multi-piston disengagement system for a vehicle brake device includes an annular housing with a plurality of housing portions, each of the housing portions having a respective pressure chamber and a respective hydraulic actuation assembly. Each hydraulic actuation assembly has a piston assembly with a hydraulically movable piston arranged to execute an actuation stroke in the axial direction to generate an actuating force for actuating a brake apparatus of the vehicle brake device, and the annular housing is arranged to dissipate the actuating force. The multi-piston disengagement system may have a pressure transmission device with a connecting device and a traction device operatively connected to the connecting device. The actu-
(Continued)

ating force can be introduced into the connecting device and the traction device can be transferred into a pressure position for exerting an axially directed pressure force against a disc pack arrangement of the brake apparatus during the actuating stroke.

18 Claims, 5 Drawing Sheets

(51) Int. Cl.

| | |
|---|---|
| *F16D 55/00* | (2006.01) |
| *F16D 121/04* | (2012.01) |
| *F16D 125/06* | (2012.01) |

(56) References Cited

U.S. PATENT DOCUMENTS

| | | | | |
|---|---|---|---|---|
| 5,330,034 | A * | 7/1994 | Rancourt | B64C 25/36 |
| | | | | 188/71.6 |
| 5,542,504 | A * | 8/1996 | Berwanger | F16D 65/543 |
| | | | | 188/71.8 |
| 6,405,837 | B1 * | 6/2002 | Muramoto | F16D 55/32 |
| | | | | 188/170 |
| 7,344,006 | B2 * | 3/2008 | Edmisten | F16D 55/40 |
| | | | | 188/73.1 |
| 10,968,971 | B2 * | 4/2021 | Herrmann | F16D 55/36 |
| 2010/0012447 | A1 | 1/2010 | Sakahara | |

FOREIGN PATENT DOCUMENTS

| | | | |
|---|---|---|---|
| DE | 102020104771 | A1 | 8/2021 |
| DE | 102021116201 | A1 | 12/2022 |
| DE | 102021116203 | B3 | 1/2023 |
| FR | 2820794 | A1 | 8/2002 |
| WO | 2023138726 | A1 | 7/2023 |

OTHER PUBLICATIONS

International Preliminary Report on Patentability Corresponding to International application No. PCT/DE2023/100126, dated Sep. 6, 2024, 11 Pages.

Communication under Rule 71(3) EPC Intention to grant Corresponding to European Application No. 23708399.3, dated Sep. 25, 2025, 54 Pages.

* cited by examiner

MULTI-PISTON DISENGAGEMENT SYSTEM FOR A BRAKE DEVICE OF A VEHICLE, BRAKE DEVICE FOR A VEHICLE HAVING A MULTI-PISTON DISENGAGEMENT SYSTEM, AND TRANSMISSION ARRANGEMENT FOR A VEHICLE HAVING THE BRAKE DEVICE

CROSS-REFERENCE TO RELATED APPLICATIONS

This application is the United States National Phase of PCT Appln. No. PCT/DE2023/100126 filed Feb. 16, 2023, which claims priority to German Application No. DE102022104136.0 filed Feb. 22, 2022, the entire disclosures of which are incorporated by reference herein.

TECHNICAL FIELD

The present disclosure relates to a multi-piston disengagement system for a brake device of a vehicle, a brake device for a vehicle having the multi-piston disengagement system and a transmission arrangement for a vehicle having the brake device.

BACKGROUND

Piston disengagement systems for actuating clutches or brakes in an electric drive train of a vehicle are well known from the prior art. For example, document DE 10 2020 104 771 A1 describes a slave cylinder for a disengagement system of a vehicle having a housing which forms a pressure chamber and having a piston which is arranged to be axially movable in the pressure chamber. In order to actuate a clutch, the piston can introduce an actuating force into the clutch.

SUMMARY

The present disclosure provides a multi-piston disengagement system which is designed for integration into a brake device of a vehicle. The multi-piston disengagement system may be designed for actuating a brake apparatus, wherein the brake apparatus is a component of the brake device. For example, the brake apparatus is a wet-running multi-disc service brake, which is or can be arranged within a wet space of an electric vehicle or hybrid vehicle. The multi-disc service brake may have a disc pack arrangement having a plurality of friction discs. The wet space can be formed by a transmission housing of a transmission arrangement for the vehicle. The vehicle may be an electric vehicle, e.g., an electrically or hybrid powered car or commercial vehicle.

The multi-piston disengagement system includes an annular housing. The annular housing has a main axis that defines an axial direction. The annular housing may be arranged concentrically and/or coaxially to the main axis.

The annular housing may have at least one flow channel, a fluid inlet and a plurality of pressure chambers which are fluidically connected to one another via the flow channel. A fluid, for example, a hydraulic fluid, may be introduced into the flow channel through the fluid inlet and flow from there into the pressure chambers.

The annular housing includes a plurality of housing portions, which may be arranged at a distance from one another in the circumferential direction around the annular housing. In each housing portion, there is a pressure chamber that is and/or can be filled with the fluid. The pressure chamber may be introduced into the housing portion and/or formed therein.

The multi-piston disengagement system includes a plurality of hydraulic actuation assemblies. For example, the multi-piston disengagement system includes four, six or eight actuation assemblies. Each actuation assembly is associated with exactly one housing portion of the annular housing. The actuation assemblies may be arranged at a distance from one another at regular intervals in the circumferential direction around the annular housing. The annular housing and the resulting ring-shaped multi-piston disengagement system may be integrated into the brake device and/or the transmission housing in a space-saving manner.

Each actuation assembly includes a piston assembly, and the piston assembly has a hydraulically movable piston. When hydraulic pressure is applied, the piston can perform an actuating stroke in the axial direction, e.g., starting from an initial position. During the actuating stroke, the piston can generate an actuating force by means of which the brake apparatus can be activated. During and/or after the execution of the actuating stroke, a pressure force may be introduced as the actuating force into a disc pack arrangement of the brake apparatus if the multi-piston disengagement system is integrated in the brake device. The actuating force can cause friction discs of the disc pack arrangement to be pressed together in a frictionally engaged manner to generate a braking force.

Each actuation assembly may have a spring assembly which includes a return device. The return device may be designed to return the piston of the respective actuation assembly to the starting position. The piston performs a return stroke when it is returned by means of the return device.

The multi-piston disengagement system includes a pressure transmission device. The pressure transmission device is designed and/or arranged to transmit the actuating force transmitted by the piston in the axial direction to the disc pack arrangement and/or to introduce it into the same. The pressure transmission device may be in operative connection with the piston for this purpose.

According to the disclosure, the actuating force of the piston can be dissipated into the annular housing. The actuating force may be dissipated into the annular housing in the axial direction by means of the pressure transmission device. The actuating force may be dissipated into the annular housing in the same direction in which the piston executes the actuating stroke.

By dissipating the actuating force to the annular housing, a force connection of the multi-piston disengagement system is closed and the actuation of the brake apparatus can take place in an axial force-free manner in an installation space surrounding the multi-piston disengagement system, e.g., in the wet space formed by the transmission housing.

In an example embodiment, the pressure transmission device includes at least one connecting device, e.g., an annular connecting plate or a plurality of connecting rods, which may be arranged concentrically and/or coaxially to the main axis. The actuating force of the piston may be introduced into the connecting device during the axially directed actuating stroke.

Optionally, the pressure transmission device also includes at least one traction device, e.g., a tension rod or a holding end plate. The traction device may be operatively connected to the connecting device, e.g., pressed together therewith. The traction device may be transferred into a pressure position during the actuating stroke of the piston in order to exert an axially directed pressure force against the friction discs of the disc pack arrangement in the pressure position.

In an example embodiment the annular housing includes at least one fastening interface, by means of which the annular housing can be fastened to a surrounding structure, e.g., to the transmission housing. For example, the at least one fastening interface is formed by a plurality of screw devices, which optionally include a hole, a bore and/or a screw. The screw devices may be arranged on the annular housing at a distance from one another in the direction of rotation of the annular housing around the main axis. The screw devices may be arranged on an inner circumference of the annular housing and/or radially on the inside. Alternatively, the screw devices are arranged on an outer circumference of the annular housing and/or radially on the outside.

In an alternative embodiment, the at least one fastening interface is formed by a central nut arranged concentrically to the main axis. The central nut may be connected to the annular housing. In a further possible alternative embodiment, it is possible that the at least one fastening interface is formed by a coaxial and/or concentric locking ring related to the main axis, which is connected to the annular housing.

In an example embodiment, each actuation assembly includes a retaining plate. The retaining plate may be placed in the axial direction on the housing portion associated with the respective actuation assembly. The retaining plate may be connected to the housing portion in a force-fitting and/or form-fitting manner, for example by being screwed thereto.

In an example embodiment, the spring assembly includes a spring sheet, a spring plate and a spiral spring. The spring plate may be connected to the spring sheet in a form-fitting and/or force-fitting manner, e.g., by being screwed thereto. The spiral spring may be arranged between the spring plate and the retaining plate. The spiral spring may be supported with one end on the retaining plate and the other end on the spring plate.

In a further embodiment, the spring assembly is operatively connected to the piston assembly of the respective actuation assembly, so that the spring assembly is carried along during the actuating stroke and the return stroke of the corresponding piston. For example, the piston is connected to the spring sheet in a form-fitting and/or force-fitting manner. The piston may press against the spring sheet when it carries out the actuating stroke in the axial direction. As a result, the spring sheet and the spring plate attached thereto are moved in the axial direction against the preload of the spiral spring. When the hydraulic pressurization on the piston is released, it is returned by the preload of the coil spring to the starting position. The spiral spring may serve as a return device.

In an example embodiment, the at least one connecting device of the pressure transmission device is operatively connected to the piston. The connecting device may be in operative connection with the spring sheet. For example, the connecting device and the spring sheet are connected to one another in a form-fitting and/or force-fitting manner, e.g., screwed together. The connecting device may be moved together with the spring sheet in the axial direction when the piston executes the actuating stroke. The connecting device may extend, e.g., starting from the spring sheet, in an axial opposite direction, which is, for example, opposite to the axial direction. The connecting device may run axially in the opposite direction through the disc pack arrangement of the brake apparatus. The traction device of the pressure transmission device may be arranged at an end of the connecting device directed in the axially opposite direction.

The present disclosure also provides a brake device for a vehicle with the multi-piston disengagement system according to the previous description. The brake device includes a brake apparatus for generating a braking force. The multi-piston disengagement system may form an actuator device for activating the brake apparatus.

The brake apparatus includes a disc pack arrangement with a plurality of friction discs. The disc pack arrangement may be arranged coaxially and/or concentrically to the main axis. The friction discs are inner discs, which are arranged to be rotatable, for example, and outer discs, which are arranged to be rotationally fixed, for example. The inner discs may be carried by a rotatable inner disc carrier, for example. The friction discs may be arranged and/or designed to be axially movable, e.g., displaceable relative to one another.

In an example embodiment, the multi-piston disengagement system is arranged in the axial direction in front of the brake apparatus. The disc pack arrangement may be arranged facing away from the piston.

In an example embodiment, the at least one connecting device of the pressure transmission device of the multi-piston disengagement system extends in the axial opposite direction through the disc pack arrangement, e.g., through the outer discs. The traction device may encompass the outermost friction disc arranged in the axial opposite direction, e.g., the outer plate, at least in sections, and presses against it in the pressure position, so that the friction discs are placed against one another in a frictionally engaged manner in the axial direction and can generate the braking force.

In a further embodiment, the friction discs are supported in the axial direction on the annular housing of the multi-piston disengagement system when they are frictionally engaged against one another in the pressure position of the traction device. A friction disc, e.g., an outer disc, which is outermost in the axial direction, may contact the annular housing in the pressure position of the traction device. The actuating force of the piston may be dissipated to the annular housing via the disc pack arrangement and with the interposition of the pressure transmission device.

is the present disclosure also provides a transmission arrangement for a vehicle. The transmission arrangement includes a transmission housing, a transmission, e.g., a planetary transmission, and the brake device according to the previous description. The transmission and the brake device are housed in the transmission housing. The outer discs may engage in a form-fitting manner in the transmission housing so that they are secured against rotation and so that they can move axially.

In an example embodiment, the brake device, e.g., the brake apparatus, is arranged in the transmission housing in such a way that it radially encompasses the transmission relative to the main axis. The inner discs may have an internal toothing with which they can mesh with a matching toothing of a component of the transmission.

In an example embodiment, the surrounding structure to which the annular housing of the multi-piston disengagement system is fastened by means of the at least one fastening interface is formed by the transmission housing. The actuating force of the piston dissipated to the annular housing may thereby be introduced into the transmission housing. The braking torques of the brake apparatus may be dissipated to the transmission housing when the friction discs are supported on the annular housing. Here, no additional housing components are required to support the release force of the brake apparatus.

US 12,590,612 B2

5

BRIEF DESCRIPTION OF THE DRAWINGS

Further features, advantages and effects of the disclosure arise from the following description of exemplary embodiments. In the figures.

DETAILED DESCRIPTION

Corresponding or identical parts are designated with the same reference symbols in the figures.

Figure 1:
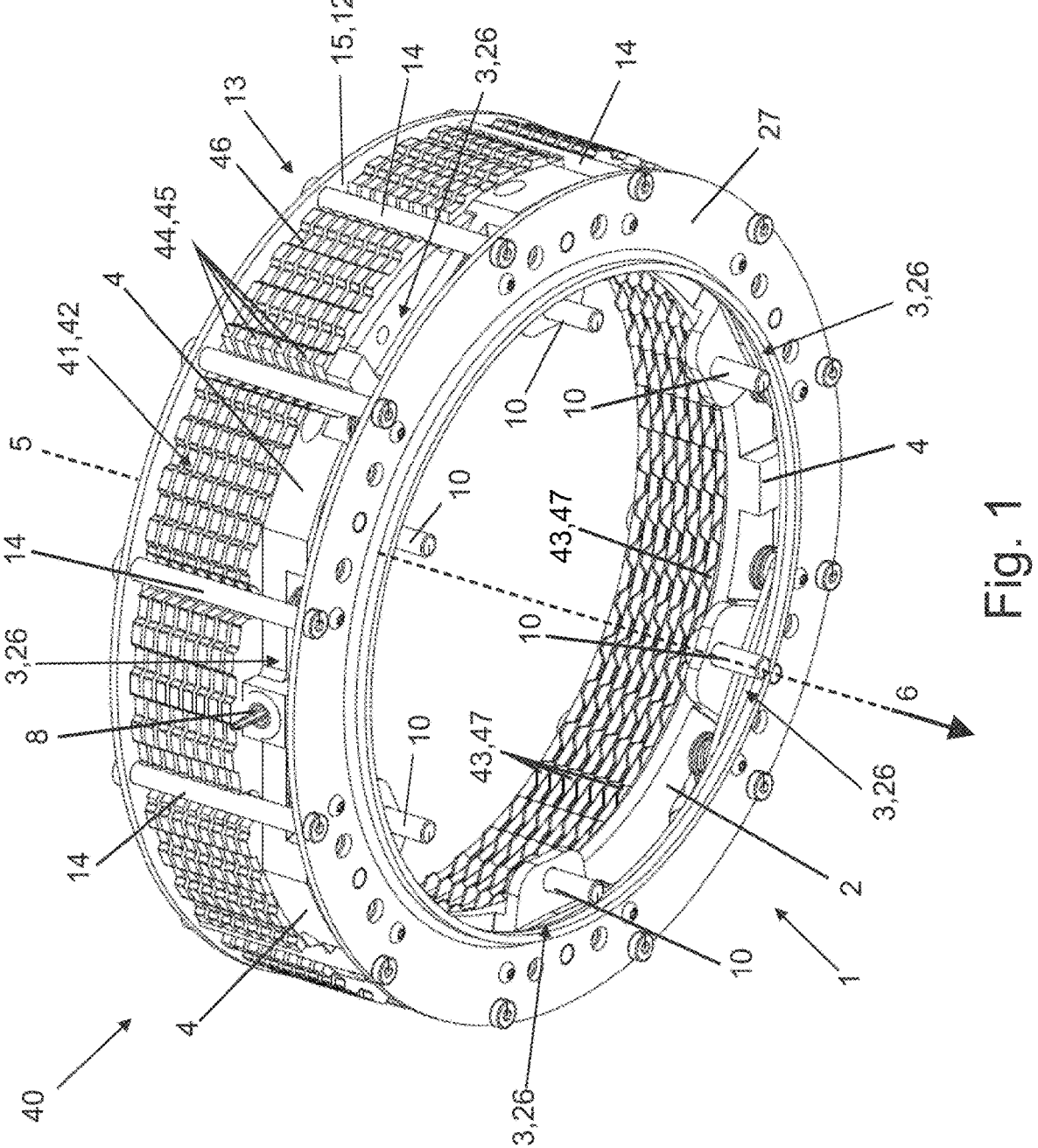
FIG. 1 shows a perspective plan view of a brake device for a vehicle.

FIG. 1 shows a perspective plan view of a brake device 40 for a vehicle. The brake device 40 can form a component of a transmission arrangement with a transmission housing filled with a wet space fluid and with a transmission, e.g., with a planetary transmission. It can be arranged together with the transmission in the transmission housing and generate a braking force there for braking at least one component of the transmission. The transmission and the brake device 40 are arranged concentrically and/or coaxially with respect to a main axis 5 of the brake device 40, wherein the brake device 40 radially surrounds the transmission. The main axis 5 defines an axial direction 6.

Figure 2:
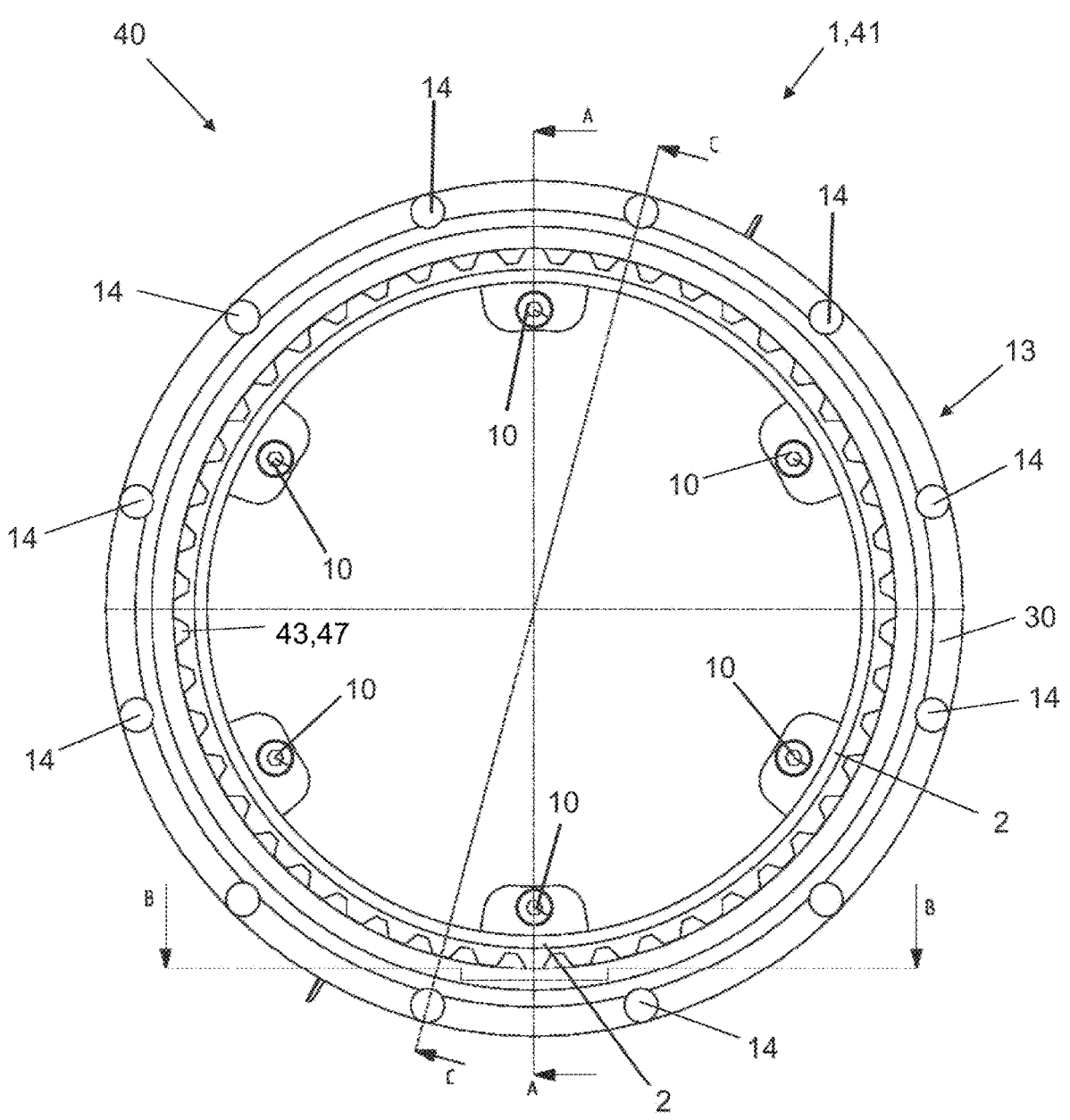
FIG. 2 shows a plan view in an axial direction of the brake device.

FIG. 2 shows the brake device 40 in a plan view in the axial direction 6. In conjunction with FIG. 1, the brake device 40 includes a brake apparatus 41 which is designed as a wet-running friction disc brake. The brake apparatus 41 has a disc pack arrangement 42 with rotatable inner discs 43 and with rotationally fixed outer discs 44. The discs 43, 44 are arranged so as to be movable, e.g., displaceable, in the axial direction 6 and in an axial opposite direction. The outer discs 44 can engage with an external toothing 45 in a form-fitting manner with a matching toothing of the transmission housing so that they are axially movable and at the same time are secured against rotation about the main axis 5. The inner discs 43 are arranged on a rotatable inner disc carrier. They include an internal toothing 47 with which they can mesh with a matching toothing of a component of the transmission. When the discs 43, 44 are displaced axially, they are placed against one another in a frictionally engaged manner so that a braking force can be generated to brake the transmission component.

The brake device 40 includes a multi-piston disengagement system 1, which forms an actuator device for actuating the brake apparatus 41 by transmitting and introducing pressure forces as actuating forces. The multi-piston disengagement system 1 is arranged concentrically and/or coaxially to the brake apparatus 41 in relation to the main axis 5. It includes an annular housing 2 and a plurality, e.g., six, actuation assemblies 3. The actuation assemblies 3 are arranged on the annular housing 2 in the circumferential direction about the main axis 5 and are accommodated in sections therein.

The annular housing 2 includes a plurality, e.g., six, housing portions 4, and a pressure chamber 9 that is and/or can be filled with a fluid (see FIGS. 3 and 4) is integrated in each housing portion 4. The pressure chambers 9 in the annular housing 2 are fluidically connected to one another by at least one flow channel which is integrated in the annular housing 2. The annular housing 2 has a fluid inlet 8 (see FIG. 1) through which the fluid can be introduced into the flow channel and into the pressure chambers 9. The fluid is different from the wet room fluid located in the transmission housing.

The multi-piston disengagement system 1 can be fastened to the transmission housing via a plurality of fastening devices 10 designed as screw devices, which are arranged spaced apart from one another in the direction of rotation around the main axis 5 and radially inward on the annular housing 2.

Figure 3:
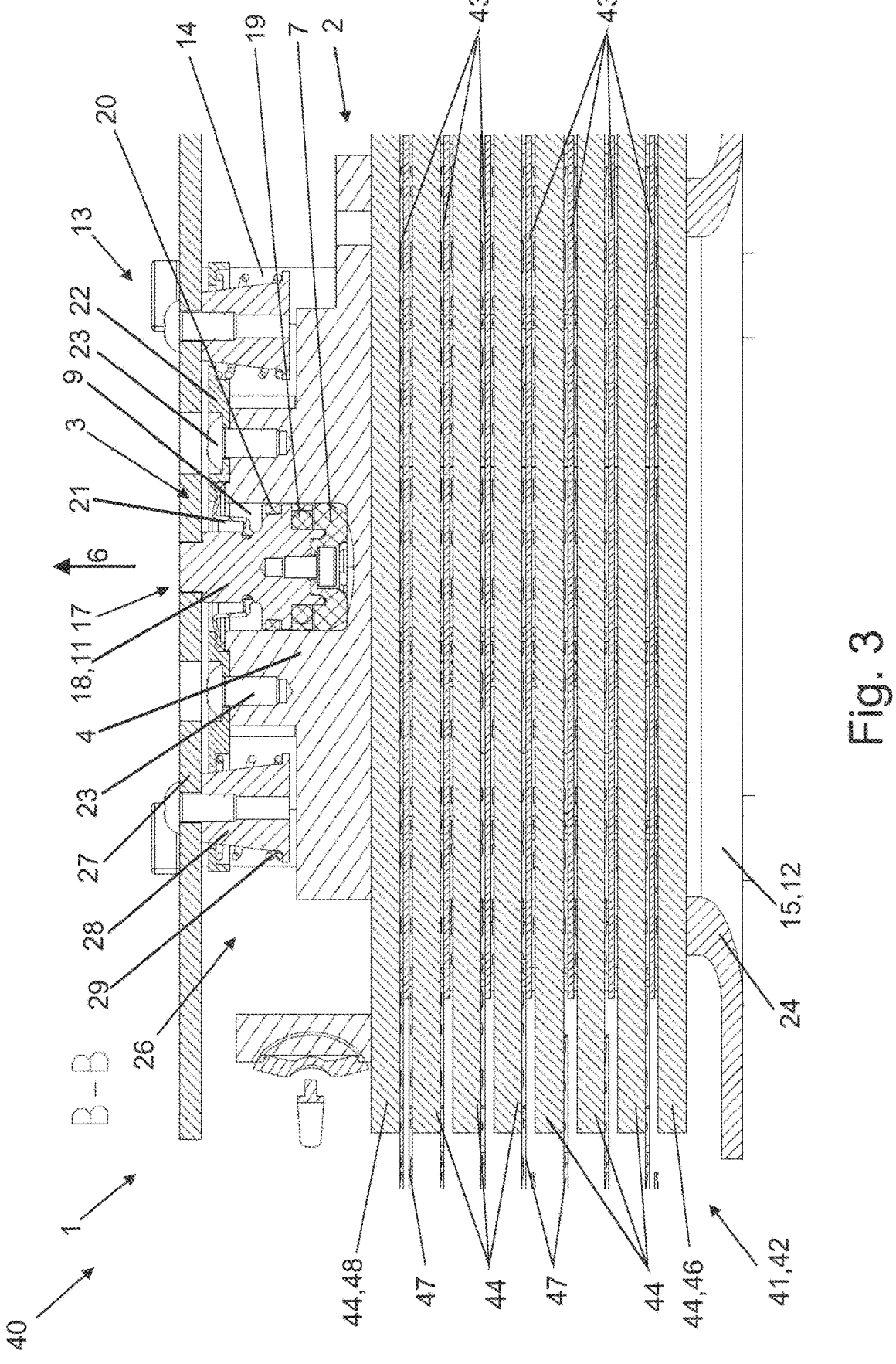
FIG. 3 shows a sectional view of the brake device of FIG. 2 along the section line B-B.

FIG. 3 shows a sectional view of the brake device 40 from FIG. 2 along the section line B-B. The brake apparatus 41 and the multi-piston disengagement system 1 are shown. The multi-piston disengagement system 1 is arranged in the axial direction 6 in front of the brake apparatus 41.

The outer discs 44 and the inner discs 43 of the disc pack arrangement 42 of the brake apparatus 41, a housing portion 4 of the annular housing 2 of the multi-piston disengagement system 1 and an actuation assembly 3 of the multi-piston disengagement system 1 are shown, wherein the actuation assembly 3 is associated with the housing portion 4. The housing portion 4 has the pressure chamber 9, which is introduced into the housing portion 4.

The actuation assembly 3 includes a piston assembly 17 with a piston 18 which is screwed to a guide body 7. The piston 18 and the guide body 7 are arranged together in the pressure chamber 9 so as to be movable in the axial direction 6, i.e., directed away from the disc pack arrangement 42. During the axial movement, the guide body 7 guides the piston 18.

The actuation assembly 3 includes a sliding band seal 19, a further seal 20 and an axial-translational seal 21. The sliding band seal 19 and the further seal 20 are designed as O-rings and are arranged on the piston 18 in an immovable manner. They seal the pressure chamber 9 during the movement of the piston 18. The axial-translational seal 21 seals the pressure chamber 9 against the transmission housing filled with the wet chamber fluid when the brake device 40 is arranged in the transmission housing.

The actuation assembly 3 includes a retaining plate 22 which is arranged in the axial direction 6 on the housing portion 4 and is screwed thereto by means of two screws 23.

When hydraulic pressure is applied by means of the fluid introduced into the pressure chamber 9, the piston 18 can carry out an actuating stroke in the axial direction 6 relative to the housing portion 4 and to the retaining plate 22 attached thereto. The actuating stroke moves the piston 18 into an actuation position 11 in which the brake apparatus 41 is actuated.

The actuation assembly 3 includes a spring assembly 26. The spring assembly 26 includes a spring sheet 27 and two spring plates 28. The spring sheet 27 is arranged in the axial direction 6 in front of the retaining plate 22. The spring plates 28 are frustoconical in shape and are screwed to the spring sheet 27. The spring assembly 26 includes two spiral springs 29 which are arranged on the spring plates 28 and surround the same. The spiral springs 29 are supported at one end on the retaining plate 22 and at the other end on support surfaces of the spring plates 28.

The piston 18 is connected to the spring sheet 27 in a form-fitting and/or force-fitting manner. During the actuating stroke of the piston 18, the spring sheet 27 is moved together with the spring plates 28 in the axial direction 6 against a preload of the spiral springs 29. The spiral springs 29 act as return devices, which return the piston 18 to its initial position in the opposite axial direction when the hydraulic pressure is released.

Figure 4:
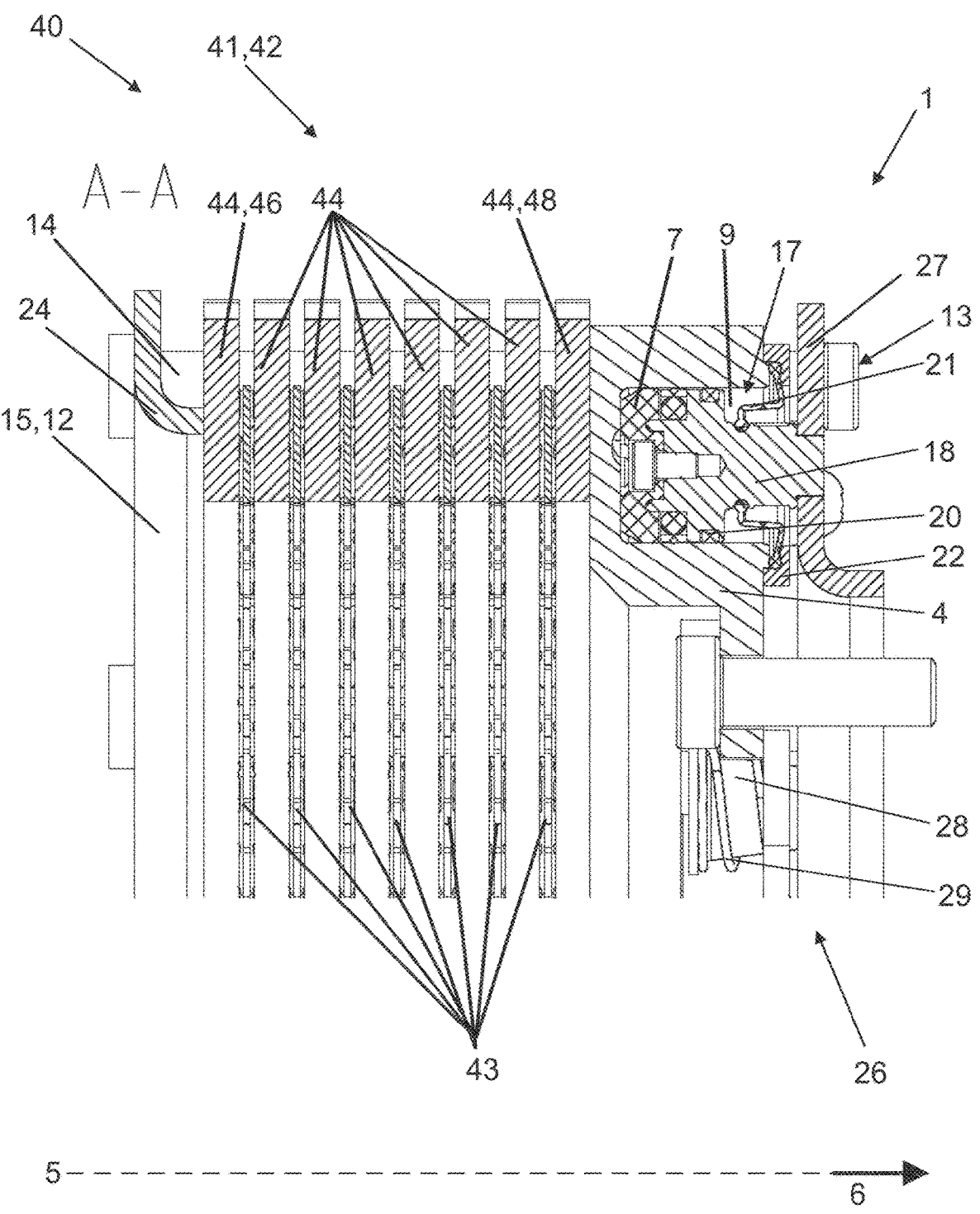
FIG. 4 shows a cross-section of the brake device from FIG. 2 along the section line A-A.
Figure 5:
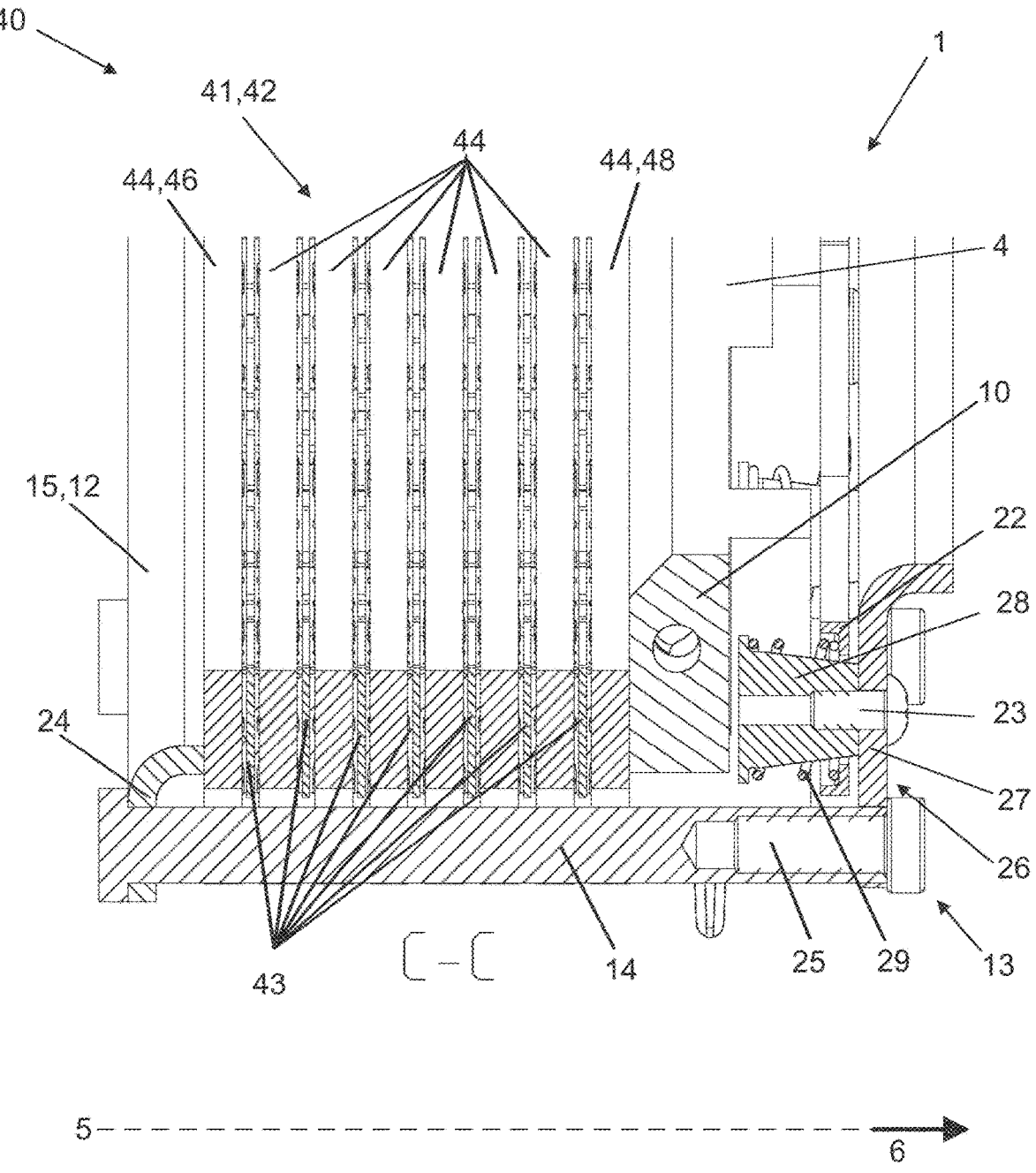
FIG. 5 shows a cross-section of the brake device from FIG. 2 along the section line C-C.

The actuation assembly 3 has a pressure transmission device 13 for transmitting and introducing the actuating force of the piston 18 into the friction disc pack arrangement 42. The pressure transmission device 13 can be seen in different perspectives in FIGS. 1 to 5. Here, FIG. 4 shows a cross-section of the brake device 40 from FIG. 2 along the section line A-A and FIG. 5 shows a cross-section of the brake device 40 from FIG. 2 along the section line C-C.

The pressure transmission device 13 includes at least one connecting device 14 arranged concentrically and/or coaxially to the main axis 5, which is designed as a plurality of connecting rods. The connecting rods run from the actuation assembly 3 in the axially opposite direction to an outermost outer disc 46 of the disc pack arrangement 42 arranged in the axially opposite direction. For this purpose, the connecting rods extend through the disc pack arrangement 42, in particular through the outer discs 44. Each connecting rod is connected to a traction device, or holding end plate, 15, designed as a tension rod, in a form-fitting and/or force-fitting manner, e.g., via a press connection 24. The traction device 15 encompasses the disc pack arrangement 42, in particular the outermost outer disc 46 arranged in the axial opposite direction, at least in sections.

The connecting device 14 is screwed to the spring sheet 27 by means of additional screws 25. As a result, the connecting device 14 is moved together with the spring sheet 27 in the axial direction 6 when the piston 18 executes the actuating stroke. During the actuating stroke of the piston 18, the traction device 15 is carried along by the connecting device 14 and moved in the axial direction 6, so that the traction device 15 assumes a pressure position 12 in which it presses axially against the outermost outer plate 46 in the axial opposite direction and places the discs 43, 44 of the disc pack arrangement 42 against one another in a frictionally engaged manner.

The disc pack arrangement 42, in particular the discs 43, 44, are pressed in the pressure position 12 of the traction device 15 in the axial direction 6 against the annular housing 2. An outermost outer disc 48 arranged in the axial direction 6 contacts the annular housing 2. As a result, a release force of the brake apparatus 41 can be supported by the annular housing 2. The actuating force of the piston 18 can be dissipated via the force transmission device 13 and the disc pack arrangement 42 into the annular housing 2 and from there into the transmission housing if the annular housing 2 is fastened to the transmission housing by means of the fastening interfaces 10.

REFERENCE NUMERALS

1 Multi-piston disengagement system
2 Annular housing
3 Actuation assembly
4 Housing portion
5 Main axis
6 Axial direction
7 Guide body
8 Fluid inlet
9 Pressure chamber
10 Fastening interfaces
11 Actuation position
12 Pressure position
13 Pressure transmission device
14 Connecting device/connecting rod
15 Traction device/holding end plate 16 Not assigned
17 Piston assembly
18 Piston
19 sliding band seal
20 Additional seal
21 Axial-translational seal
22 Retaining plate
23 Screws
24 Press connection
25 Additional screws
26 Spring assembly
27 Spring sheet
28 Spring plate
29 Spiral spring
40 Brake device
41 Brake apparatus
42 Disc pack arrangement
43 Inner disc
44 Outer disc
45 Outer toothing
46 Outermost outer disc in the axial opposite direction
47 Internal toothing
48 Outermost outer disc in the axial direction

The invention claimed is:

1. A multi-piston disengagement system for a brake device of a vehicle,
   having an annular housing, wherein the annular housing comprises a main axis, wherein the main axis defines an axial direction,
   wherein the annular housing comprises a plurality of housing portions, wherein a pressure chamber that or can be filled with a fluid is arranged in each housing portion,
   having a plurality of hydraulic actuation assemblies, wherein a housing portion is associated with each actuation assembly,
   wherein each actuation assembly comprises a piston assembly with a hydraulically movable piston, wherein the piston can execute an actuating stroke in the axial direction when hydraulic pressure is applied and can generate an actuating force for activating a brake apparatus of the brake device,
   wherein the actuating force can be dissipated into the annular housing,
   having a pressure transmission device for transmitting or introducing the actuating force to a disc pack arrangement of the brake apparatus,
   wherein the pressure transmission device comprises connecting rods and a holding end plate that is operatively connected to the connecting rods, wherein the actuating force of the piston can be introduced into the connecting rods in the axial direction, and wherein the holding end plate can be transferred into a pressure position for exerting an axially directed pressure force against the disc pack arrangement of the brake apparatus during the actuating stroke of the piston.

2. The multi-piston disengagement system according to claim 1, wherein the annular housing has at least one fastening interface for fastening the annular housing to a surrounding structure.

3. The multi-piston disengagement system according to claim 2, wherein the at least one fastening interface is formed by a plurality of screws, wherein the screws are arranged on the annular housing at a distance from one another in a direction of rotation of the annular housing about the main axis, wherein the screws are arranged on an inner circumference or on an outer circumference of the annular housing.

4. A brake device for a transmission arrangement of a vehicle having the multi-piston disengagement system according to claim 1 and having the brake apparatus, wherein the brake apparatus has the disc pack arrangement with a plurality of friction discs.

5. The brake device according to claim 4, wherein the multi-piston disengagement system is arranged in front of the brake apparatus in the axial direction.

6. The brake device according to claim 4, wherein at least one of the connecting rods extends in an axial opposite direction through the disc pack arrangement, wherein the holding end plate encompasses the disc pack arrangement at least in sections and exerts a pressure force against the friction discs of the disc pack arrangement in the pressure position.

7. The brake device according to claim 4, wherein the friction discs are placed against one another in a frictionally engaged manner in the pressure position of the holding end plate and are supported on the annular housing in the axial direction.

8. A transmission arrangement for a vehicle, wherein the transmission arrangement comprises a transmission housing, a transmission and the brake device according to claim 4, wherein the transmission and the brake device are accommodated in the transmission housing.

9. The transmission arrangement according to claim 8, wherein the annular housing has at least one fastening interface for fastening the annular housing to a surrounding structure and the surrounding structure is formed by the transmission housing.

10. A multi-piston disengagement system for a vehicle brake device, comprising:
  an annular housing comprising:
    a main axis that defines an axial direction; and
    a plurality of housing portions, each of the housing portions comprising a respective pressure chamber and a respective hydraulic actuation assembly; and
  a pressure transmission device comprising:
    a connecting rod, wherein the actuating force can be introduced into the connecting rod in the axial direction; and
    a holding end plate operatively connected to the connecting rod, wherein:
      each hydraulic actuation assembly comprises a piston assembly comprising a hydraulically movable piston arranged to execute an actuation stroke in the axial direction to generate an actuating force for actuating a brake apparatus of the vehicle brake device;
      the annular housing is arranged to dissipate the actuating force; and
      the holding end plate can be transferred into a pressure position for exerting an axially directed pressure force against a disc pack arrangement of the brake apparatus during the actuating stroke to transmit or introduce the actuating force to the disc pack arrangement.

11. The multi-piston disengagement system of claim 10, wherein the annular housing further comprises a fastening interface for fastening the annular housing to a surrounding structure.

12. The multi-piston disengagement system of claim 11, wherein the fastening interface comprises a plurality of screws distributed on an inner circumference or an outer circumference of the annular housing in a rotation direction of the annular housing about the main axis.

13. A vehicle brake device comprising:
  the multi-piston disengagement system of claim 10; and
  the brake apparatus, wherein the disc pack arrangement comprises a plurality of friction discs.

14. The vehicle brake device of claim 13, wherein the multi-piston disengagement system is arranged in front of the brake apparatus in the axial direction.

15. The vehicle brake device of claim 13 wherein:
  the connecting rod extends in an axial opposite direction, opposite the axial direction, through the disc pack arrangement; and
  the holding end plate encompasses the disc pack arrangement at least in sections and exerts a pressure force against the friction discs in the pressure position.

16. The vehicle brake device of claim 13, wherein the friction discs are placed against one another in a frictionally engaged manner in the pressure position of the holding end plate and supported on the annular housing in the axial direction.

17. A brake assembly for a transmission arrangement of a vehicle comprising:
  a brake apparatus comprising a disc pack arrangement, the disc pack arrangement comprising a plurality of friction discs; and
  a multi-piston disengagement system comprising:
    an annular housing comprising:
      a main axis that defines an axial direction; and
      a plurality of housing portions, each of the housing portions comprising a respective pressure chamber and a respective hydraulic actuation assembly, wherein:
        each hydraulic actuation assembly comprises a piston assembly comprising a hydraulically movable piston arranged to execute an actuation stroke in the axial direction to generate an actuating force for actuating the brake apparatus of the vehicle; and
      the annular housing is arranged to dissipate the actuating force; and
      a fastening interface for fastening the annular housing to a surrounding structure; and
      a pressure transmission device comprising:
        a connecting rod, wherein the actuating force from the piston can be introduced into the connecting rod in the axial direction, wherein the connecting rod extends in the axial opposite direction, opposite the axial direction, through the disc pack arrangement; and
        a holding end plate operatively connected to the connecting rod, wherein the holding end plate can be transferred into a pressure position for exerting an axially directed pressure force against the disc pack arrangement of the brake apparatus during the actuating stroke to transmit or introduce the actuating force to the disc pack arrangement.

18. The brake assembly of claim 17, wherein the friction discs are placed against one another in a frictionally engaged manner in the pressure position of the holding end plate and supported on the annular housing in the axial direction.

\* \* \* \* \*